US 9,724,252 B2

(12) United States Patent
Nishiyama et al.

(10) Patent No.: US 9,724,252 B2
(45) Date of Patent: Aug. 8, 2017

(54) MOUNTING DEVICE FOR OBJECT TO BE MOUNTED

(71) Applicant: HONDA MOTOR CO., LTD., Tokyo (JP)

(72) Inventors: Kimito Nishiyama, Saitama (JP); Daisuke Watanabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/650,690

(22) PCT Filed: Dec. 11, 2013

(86) PCT No.: PCT/JP2013/083219
§ 371 (c)(1),
(2) Date: Jun. 9, 2015

(87) PCT Pub. No.: WO2014/092120
PCT Pub. Date: Jun. 19, 2014

(65) Prior Publication Data
US 2015/0328066 A1    Nov. 19, 2015

(30) Foreign Application Priority Data

Dec. 11, 2012   (JP) ................................ 2012-270479

(51) Int. Cl.
*A61G 3/06*    (2006.01)
*B60P 1/43*    (2006.01)
*A61G 3/08*    (2006.01)

(52) U.S. Cl.
CPC ............... *A61G 3/061* (2013.01); *B60P 1/43* (2013.01); *A61G 3/0808* (2013.01)

(58) Field of Classification Search
CPC .... B60P 1/43; B60P 1/48; B60P 1/438; B60P 1/436; B60P 1/435; B60P 1/433;
(Continued)

(56) References Cited

U.S. PATENT DOCUMENTS

| 1,569,469 A | 1/1926 | Eizey |
| 3,030,645 A | 2/1958 | Shaw |

(Continued)

FOREIGN PATENT DOCUMENTS

| CA | 2174382 | 10/1997 |
| GB | 2 170 174 | 7/1996 |

(Continued)

OTHER PUBLICATIONS

Australian Office Action dated Feb. 15, 2016.
European Search Report dated Jun. 24, 2016, 6 pages.

*Primary Examiner* — Kaitlin Joerger
(74) *Attorney, Agent, or Firm* — Rankin, Hill & Clark LLP

(57) ABSTRACT

A slope having a main plate for changing position between a low position and a high position, and a control unit for controlling position change of the slope, are included. The control unit includes: a first mounting detection means which detects a state of being mounted or a state of not being mounted by a wheelchair with regard to the main plate; a second mounting detection means which detects a state of being mounted or a state of not being mounted by a wheelchair with regard to a ground side plate; a third mounting detection means which detects a state of being mounted or a state of not being mounted by a wheelchair with regard to a vehicle side plate; and a ground detection means which detects whether the end of the ground side plate at the rear side of a vehicle is in contact with a ground surface.

11 Claims, 14 Drawing Sheets

(58) Field of Classification Search
CPC .. B60P 1/44; B60P 1/4407; B60P 3/00; B60P 3/122; B60P 3/41; B60N 99/00; B65G 69/28; B62B 5/003; A61G 6/06; A61G 6/006; A61G 6/061; A61G 6/062; A61G 6/063
See application file for complete search history.

(56) References Cited

U.S. PATENT DOCUMENTS

| | | | | |
|---|---|---|---|---|
| 3,679,074 A | * | 7/1972 | Kuehl | B60P 1/44 296/57.1 |
| 5,040,936 A | * | 8/1991 | Rhea | A61G 3/06 187/901 |
| 5,312,148 A | * | 5/1994 | Morgan | B60P 1/435 296/61 |
| 5,791,717 A | * | 8/1998 | Reich | B60P 1/435 14/71.1 |
| 5,865,593 A | * | 2/1999 | Cohn | A61G 3/06 414/545 |
| 6,149,372 A | * | 11/2000 | Lee | B62B 5/0003 414/500 |
| 6,616,396 B2 | * | 9/2003 | Sternberg | B60P 1/431 414/538 |
| 7,001,132 B2 | * | 2/2006 | Koretsky | A61G 3/061 414/537 |
| 7,533,432 B2 | * | 5/2009 | Morris | A61G 3/061 14/71.3 |
| 7,637,518 B2 | * | 12/2009 | Adair | B65G 69/30 280/163 |
| 7,810,198 B2 | * | 10/2010 | Sahr | A61G 3/06 14/69.5 |
| 8,079,798 B2 | * | 12/2011 | Smith | A61G 3/061 14/71.1 |
| 8,122,551 B2 | * | 2/2012 | Istre | B60P 1/43 14/69.5 |
| 8,197,176 B2 | * | 6/2012 | Salazar Corcuera | B60P 1/435 414/500 |
| 8,302,235 B1 | * | 11/2012 | Bailie | B60P 1/43 14/69.5 |
| 8,821,102 B1 | * | 9/2014 | Boguslawski | B65G 69/30 14/71.1 |
| 9,011,073 B2 | * | 4/2015 | Dieziger | B60P 1/433 414/506 |
| 9,101,519 B2 | * | 8/2015 | Smith | A61G 3/061 |
| 9,271,883 B2 | * | 3/2016 | Johnson | A61G 3/061 |
| 2003/0223847 A1 | * | 12/2003 | Crider | B60P 1/4407 414/438 |
| 2005/0036867 A1 | * | 2/2005 | Dyck | A61G 3/06 414/522 |
| 2007/0086879 A1 | * | 4/2007 | Goodrich | A61G 3/061 414/537 |
| 2007/0246965 A1 | | 10/2007 | Adair | |
| 2008/0246295 A1 | * | 10/2008 | Bejin | B60P 1/003 296/61 |
| 2011/0123304 A1 | * | 5/2011 | Thomas | B60P 3/122 414/538 |
| 2012/0204360 A1 | * | 8/2012 | Chamoun | B62D 63/061 14/2.4 |
| 2015/0086313 A1 | * | 3/2015 | Perez | B60P 1/431 414/537 |
| 2015/0224907 A1 | * | 8/2015 | Holmgren | B60P 3/08 414/482 |

FOREIGN PATENT DOCUMENTS

| | | |
|---|---|---|
| JP | 2001-276135 | 10/2001 |
| JP | 2006-271661 | 10/2006 |
| JP | 2010-143302 | 7/2010 |
| WO | 02/079018 A1 | 10/2002 |
| WO | 2005/049357 A2 | 6/2005 |

\* cited by examiner

MOUNTING DEVICE FOR OBJECT TO BE MOUNTED

TECHNICAL FIELD

The present invention relates to a mounting device for mounting an object to be mounted, for example, a wheelchair in which a cared person sits.

BACKGROUND ART

For example, Patent Document 1 discloses a wheelchair lifting device for lifting a wheelchair along a slope which is bridged between a road surface and a floor surface of a vehicle body rear opening. The wheelchair lifting device employs a structure for lifting the wheelchair along the slope while a passenger sits in the wheelchair by winding a belt which is engaged with the wheelchair by an electric winch.

CITATION LIST

Patent Literature

{Patent Document 1}
Japanese Patent Application Publication No. 2006-271661

SUMMARY OF INVENTION

Technical Problem

Meanwhile, in recent years, by mounting a battery under a vehicle floor, vehicles (for example, a hybrid vehicle, an electric vehicle, or the like) having an opening ground clearance of a tailgate higher than the prior art at a rear portion of the vehicle body have been increased. In a case where the wheelchair lifting device disclosed in Patent Document 1 is applied to such a vehicle having a high opening ground clearance, an inclination angle and a longitudinal length of the slope are affected when the slope is grounded, and an excessive load is applied to the electric winch for winding the belt.

Therefore, it is considered that the slope is composed of a plurality of plates, and adjacent plates are connected to each other by a plurality of rotating shafts. In this case, there is a problem that when the object to be mounted is mounted between the adjacent plates across the rotating shaft, and the slope is displaced by rotating the rotating shaft, a smooth movement of the object to be mounted is difficult.

A general object of the present invention is to provide a mounting device for an object to be mounted, which is capable of smoothly moving the object to be mounted.

Solution to Problem

In order to achieve the object, the present invention is a mounting device for an object to be mounted, including: a main plate on which the object to be mounted is mounted; a vehicle side plate which is provided between a vehicle body and one end of the main plate, and is composed of at least one plate; a ground side plate which is provided between a ground surface and the other end of the main plate, and is composed of at least one plate; a plurality of rotating shafts which are provided between the vehicle body and the vehicle side plate, and between the respective plates; a drive means which rotates the rotating shafts; a slope which is configured to include the main plate, the vehicle side plate, the ground side plate, and the plurality of rotating shafts, and in which the main plate is displaced between a low position and a high position by rotating the plurality of rotating shafts by the drive means; and a control means which controls a displacement of the slope, wherein the control means includes a first mounting detection means which detects a mounted state or a non-mounted state of the object to be mounted with respect to the main plate, and wherein the control means allows the displacement of the slope when the first mounting detection means detects that the object to be mounted is in the mounted state on the main plate.

According to the present invention, the displacement of the slope is inhibited (not allowed) by the control means in a state where the object to be mounted is not mounted on the main plate. Therefore, the displacement of the slope is suitably avoided in a state where the object to be mounted is mounted on a site other than the main plate which is a predetermined position. Consequently, in the present invention, it is possible to displace the slope smoothly and stably in a state where the object to be mounted is securely mounted on the predetermined position (mounted only on the main plate).

Further, the present invention is the mounting device for the object to be mounted, wherein the control means includes a second mounting detection means which detects a mounted state or a non-mounted state of the object to be mounted with respect to the ground side plate, and wherein the control means allows the displacement of the slope when the first mounting detection means detects that the object to be mounted is in the mounted state on the main plate and the second mounting detection means detects that the object to be mounted is in the non-mounted state on the ground side plate.

According to the present invention, when the main plate constituting the slope is in the low position, the displacement of the slope is allowed in a state where the first mounting detection means detects that the object to be mounted is mounted on the main plate and the second mounting detection means detects that the object to be mounted is not mounted on the ground side plate. Consequently, in the present invention, it is possible to stably displace the slope (move the slope upwardly in a parallel fashion) in a state where the object to be mounted is securely mounted on the predetermined position (mounted only on the main plate).

Further, the present invention is the mounting device for the object to be mounted, wherein the control means includes a third mounting detection means which detects a mounted state or a non-mounted state of the object to be mounted with respect to the vehicle side plate, and wherein the control means allows the displacement of the slope when the first mounting detection means detects that the object to be mounted is in the mounted state on the main plate and the third mounting detection means detects that the object to be mounted is in the non-mounted state on the vehicle side plate.

According to the present invention, when the main plate constituting the slope is in the high position, the displacement of the slope is allowed in a state where the first mounting detection means detects that the object to be mounted is mounted on the main plate and the third mounting detection means detects that the object to be mounted is not mounted on the vehicle side plate. Consequently, in the present invention, it is possible to stably displace the slope (move the slope downwardly in a parallel fashion) in a state where the object to be mounted is securely mounted on the predetermined position (mounted only on the main plate).

Further, the present invention is the mounting device for the object to be mounted, wherein the control means includes a second mounting detection means which detects a mounted state or a non-mounted state of the object to be mounted with respect to the ground side plate and a third mounting detection means which detects a mounted state or a non-mounted state of the object to be mounted with respect to the vehicle side plate, and wherein the control means allows the displacement of the slope when the first mounting detection means detects that the object to be mounted is in the mounted state on the main plate and both the second mounting detection means and the third mounting detection means detect that the object to be mounted is in the non-mounted state.

According to the present invention, when the first mounting detection means detects that the object to be mounted is in the mounted state on the main plate and both the second mounting detection means and the third mounting detection means detect that the object to be mounted is in the non-mounted state, the control means allows the displacement of the slope because the object to be mounted is securely mounted only on the main plate. Consequently, in the present invention, it is possible to stably displace the slope in a state where the object to be mounted is securely mounted on the predetermined position (mounted only on the main plate), as well as to improve the convenience.

Further, the present invention is the mounting device for the object to be mounted, wherein the control means includes a ground detection means which detects whether or not another end of the ground side plate is in contact with the ground surface, and wherein the control means allows the displacement of the slope when the ground detection means detects that the other end of the ground side plate is in contact with the ground surface.

According to the present invention, the control means allows the displacement of the slope when the ground detection means reliably detects that the slope is bridged between the vehicle body and the ground surface, and the control means does not allow the displacement of the slope when the slope is not bridged therebetween, and thus the slope can be stably displaced.

Furthermore, the present invention is the mounting device for the object to be mounted, further including a switching means which switches between a rotatable state of the rotating shaft and a non-rotatable state of the rotating shaft, wherein the control means switches between an allowed state for allowing the displacement of the slope and an inhibited state for inhibiting the displacement of the slope by switching control of the switching means.

According to the present invention, when the control means allows the displacement of the slope, the switching means can easily switch between an allowed state for allowing the displacement of the slope and an inhibited state for inhibiting the displacement of the slope. Consequently, in the present invention, it is possible to stably displace the slope, as well as to improve the convenience.

Advantageous Effects of Invention

According to the present invention, it is possible to provide a mounting device for an object to be mounted, which is capable of smoothly moving the object to be mounted.

DESCRIPTION OF EMBODIMENTS

Figure 1:
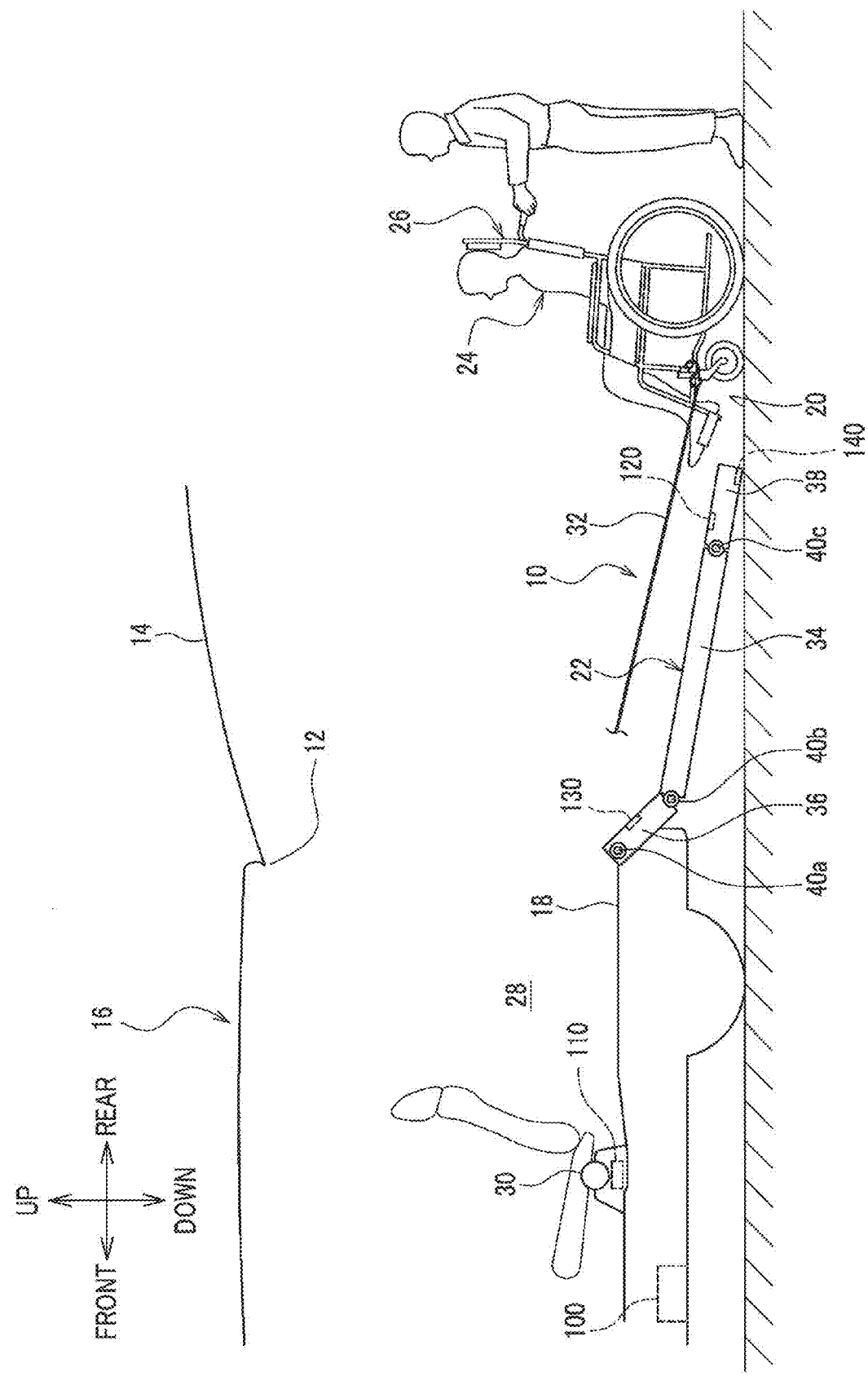
FIG. 1 is a side view of a state in which a mounting device according to an embodiment of the present invention is applied to a vehicle.
Figure 2:
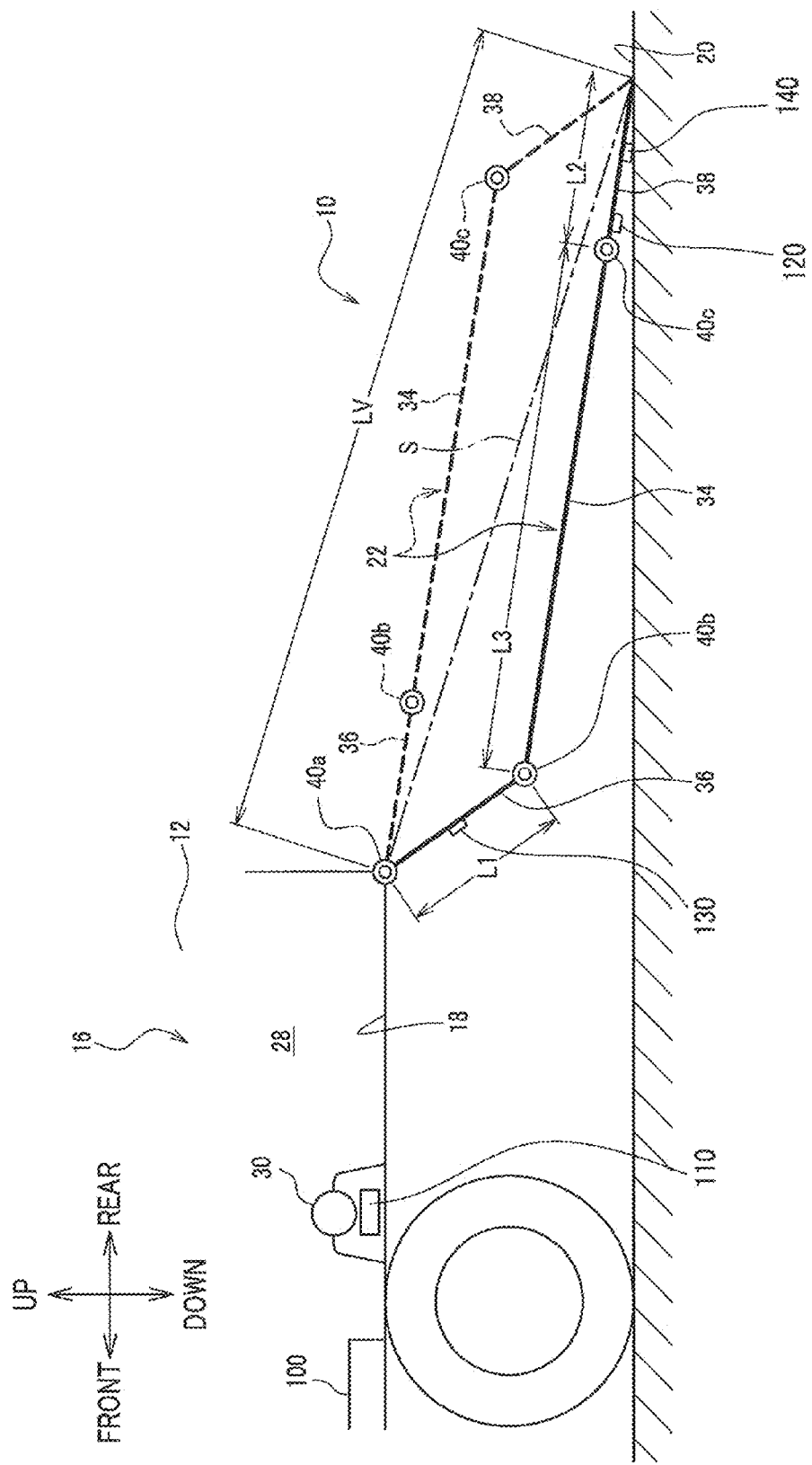
FIG. 2 is a schematic diagram of a slope and the vehicle shown in FIG. 1.

Next, an embodiment of the present invention will be described in detail with appropriate reference to the accompanying drawings. FIG. 1 is a side view of a state in which a mounting device according to the embodiment of the present invention is applied to a vehicle, and FIG. 2 is a schematic diagram of a slope and the vehicle shown in FIG. 1. Note that, "front-rear" and "up-down" shown by arrows in each FIG. show a front-rear direction and an up-down direction (a vertical up-down direction) of the vehicle, and "left-right" shows a left-right direction (vehicle width direction) as viewed from a driver's seat, respectively.

As shown in FIG. 1, a mounting device 10 according to the embodiment of the present invention is applied, for example, to a vehicle 16 provided with a back door (tail gate) 14 for opening and closing a vehicle body rear opening 12. Note that, the mounting device 10 is not limited to the vehicle 16 including the back door 14, and can be applied, for example, to a vehicle including left and right rear doors (not shown).

The mounting device 10 includes a slope 22 which is bridged between a ground surface (road surface) 20 and a floor surface 18 of the vehicle body rear opening 12. The slope 22 is for pulling a wheelchair (an object to be mounted) 26, in which a cared person 24 sits, into a rear compartment space 28, and is for pulling out the wheelchair 26 to the outside of the vehicle.

A pair of left and right electric winches 30 is provided in a compartment of the vehicle 16. The pair of left and right electric winches 30 includes a drum (not shown) capable of winding and pulling out a belt 32 which is engaged with the wheelchair 26, and is capable of pulling the wheelchair 26, in which the cared person 24 sits, into the rear compartment space 28. Incidentally, the pair of left and right electric winches 30 is arranged, for example, between a seat and a vehicle body in the vehicle width direction.

As shown in FIG. 2, the slope 22 is composed of a main plate 34 on which the wheelchair 26 is mounted, a vehicle side plate 36 made of a plate which is provided between the vehicle body rear opening (vehicle body) 12 and one end on the vehicle front side of the main plate 34, and a ground side plate 38 made of a plate which is provided between a ground surface 20 and the other end on the vehicle rear side of the main plate 34.

The main plate 34, the vehicle side plate 36, and the ground side plate 38 are respectively made of a rectangular flat plate in a plan view, and may be suitably configured with a hollow body of a resin material or a light metal material. It is intended to reduce the weight of the slope 22.

In the present embodiment, the main plate 34 is made of a single plate, but the main plate 34 may be, for example, the entire plural plates which are employed such that the adjacent plural plates slide to each other. Further, the vehicle side plate 36 and the ground side plate 38 are not respectively limited to a single plate, and may be composed of plural plates (see FIG. 14 to be described later).

Figure 6:
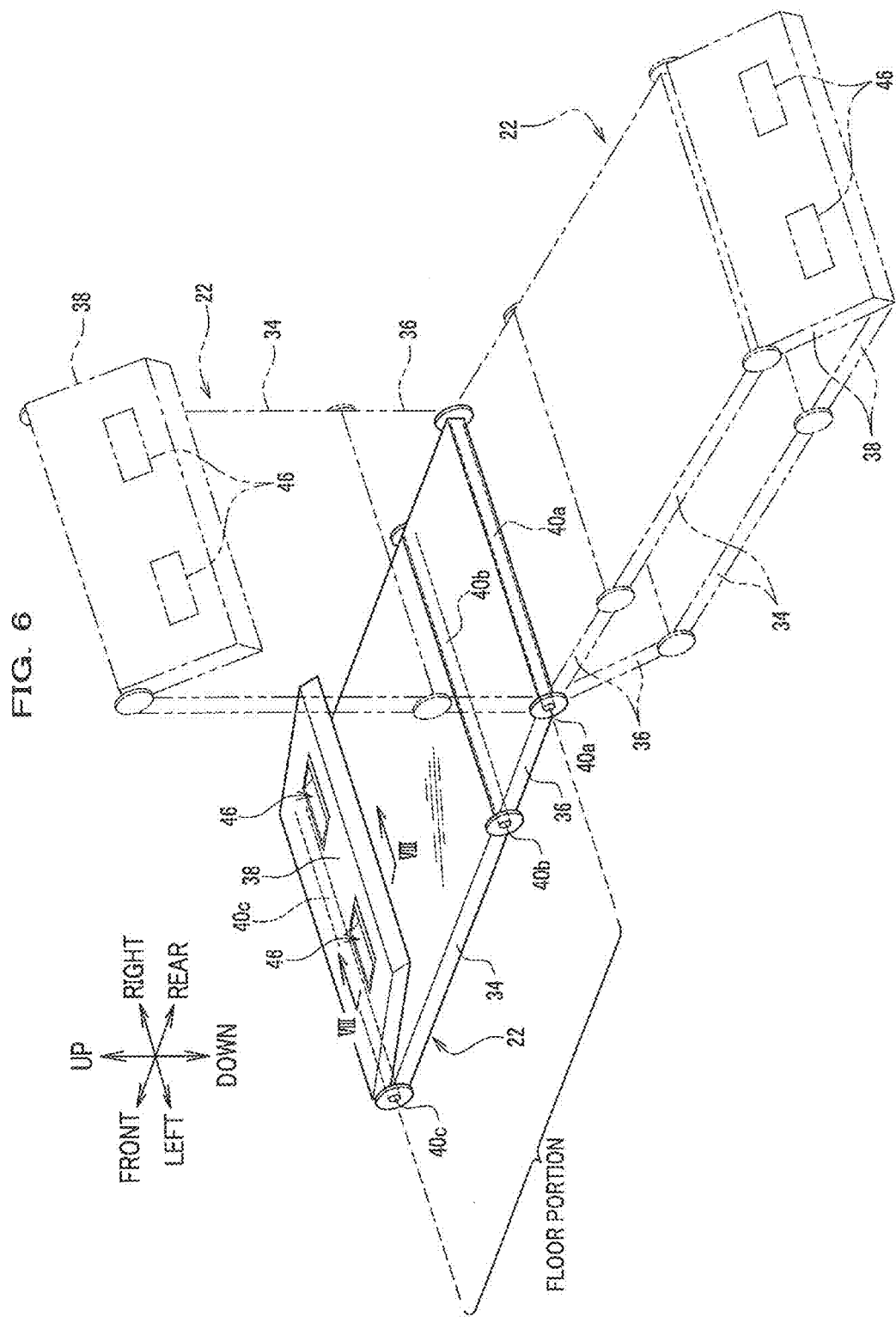
FIG. 6 is an explanatory view showing a grounded state, an upright stationary state, and a housed state of the slope.

As shown in FIG. 1, 2, or 6, between the vehicle side plate 36 and the floor surface 18 of the vehicle 16, a first rotating shaft 40a extending in the vehicle width direction is provided. The vehicle side plate 36 is rotatably connected to the floor surface 18 on a fixed side around an axial center of the first rotating shaft 40a as a rotation center. Further, between the vehicle side plate 36 and the main plate 34, a second rotating shaft 40b extending in the vehicle width direction is provided. The vehicle side plate 36 and the main plate 34 are connected to each other rotatably around an axial center of the second rotating shaft 40b as a rotation center. Further, between the main plate 34 and the ground side plate 38, a third rotating shaft 40c extending in the vehicle width direction is provided. The main plate 34 and the ground side plate 38 are connected to each other rotatably around an axial center of the third rotating shaft 40c as a rotation center.

As shown in FIG. 2, a size L1 of the vehicle side plate 36 in a direction (vehicle front-rear direction) perpendicular to the first to third rotating shafts 40a to 40c is set to be equal to a size L2 of the ground side plate 38 in the direction (vehicle front-rear direction) perpendicular to the first to third rotating shafts 40a to 40c (L1=L2). In other words, the size L1 of the vehicle side plate 36 and the size L2 of the ground side plate 38 are set to be equal to each other.

When the size L1 of the vehicle side plate 36 and the size L2 of the ground side plate 38 are set to be equal to each other (L1=L2), the main plate 34 can be displaced (positionally changed) between a low position (see a thick solid line in FIG. 2) and a high position (see a thick broken line in FIG. 2) in a state of maintaining an angle of the main plate 34 at a predetermined angle. Therefore, it is possible to improve stability of the wheelchair 26 during the displacement (position change) of the main plate 34.

As shown in FIG. 2, a size L3 of the main plate 34 in the direction (vehicle front-rear direction) perpendicular to the first to third rotating shafts 40a to 40c is set to be larger than the size L1 of the vehicle side plate 36 in the direction (vehicle front-rear direction) perpendicular to the first to third rotating shafts 40a to 40c and the size L2 of the ground side plate 38 in the direction (vehicle front-rear direction) perpendicular to the first to third rotating shafts 40a to 40c (L3>L1, L2).

When the size L3 of the main plate 34 is set to be larger than the size L1 of the vehicle side plate 36 and the size L2 of the ground side plate 38 (L3>L1, L2), it is possible to largely ensure a mountable range (mountable area) in which the wheelchair 26 can be stably displaced (positionally changed), thereby improving the stability of the wheelchair 26 during the displacement of the slope 22.

The total (L1+L2+L3) of the size L1, the size L2, and the size L3 shown in FIG. 2 is set to be larger than a size LV of a virtual straight line S (see a thin one-dot chain line in FIG. 2) which connects the ground surface 20 and the axial center of the first rotating shaft 40a provided between the vehicle body and one end on the vehicle front side of the main plate 34. Note that, the size L1 is the size of the vehicle side plate 36 in the direction (vehicle front-rear direction) perpendicular to the first to third rotating shafts 40a to 40c, the size L3 is the size of the main plate 34 in the direction (vehicle front-rear direction) perpendicular to the first to third rotating shafts 40a to 40c, and the size L2 is the size of the ground side plate 38 in the direction (vehicle front-rear direction) perpendicular to the first to third rotating shafts 40a to 40c.

When the total (L1+L2+L3) of the size L1 of the vehicle side plate 36, the size L3 of the main plate 34, and the size L2 of the ground side plate 38 is set to be larger than the size LV of the virtual straight line S ((L1+L2+L3)>LV), the slope 22 can be displaced without moving another end of the ground side plate 38 which is in contact with the ground surface 20.

The mounting device 10 includes drive mechanisms (drive means) 42 (see FIGS. 3 and 4) for respectively rotating the first to third rotating shafts 40a to 40c. Further, the mounting device 10 includes switching mechanisms (switching means) 44 (see FIGS. 3 and 4) for switching between a rotatable state, in which the first to third rotating shafts 40a to 40c are in the rotatable state by transmitting driving forces by the drive mechanisms 42, and a non-rotatable state, in which the first to third rotating shafts 40a to 40c are in the non-rotatable state by interrupting the driving forces by the drive mechanisms 42.

The slope 22 is provided such that the main plate 34 is displaced between the high position (position of the thick broken line in FIG. 2) and the low position (position of the thick solid line in FIG. 2) in the up-down direction by rotating the first to third rotating shafts 40a to 40c by the drive mechanisms 42. The main plate 34 moves in the up-down direction in a parallel fashion between the high position and the low position while maintaining an inclination angle of the main plate 34 at the predetermined angle.

It is set such that an axial line in the vehicle front-rear direction of the main plate 34 and an axial line in the vehicle front-rear direction of the ground side plate 38 are horizontal when the main plate 34 is in a state of the low position (position of the thick solid line in FIG. 2) in the up-down direction. When the main plate 34 is in the state of the low position, an axial line in the vehicle front-rear direction of the vehicle side plate 36 is set in a state of being inclined downwardly at a predetermined angle to the main plate 34 side (the rear side of the vehicle).

It is set such that the axial line in the vehicle front-rear direction of the vehicle side plate 36 and the axial line in the vehicle front-rear direction of the main plate 34 are horizontal when the main plate 34 is in a state of the high position (position of the thick broken line in FIG. 2) in the up-down direction. When the main plate 34 is in the state of the high position, the axial line in the vehicle front-rear direction of the ground side plate 38 is set in a state of being inclined downwardly at a predetermined angle to the rear side of the vehicle.

The drive mechanisms 42 are respectively provided to the first to third rotating shafts 40*a* to 40*c*, and each of the drive mechanisms 42 is configured to be the same. Therefore, the drive mechanism 42 for rotating the third rotating shaft 40*c* will be described in detail, and description of the drive mechanisms 42 for rotating the first rotating shaft 40*a* and the second rotating shaft 40*b* will be omitted.

Figure 3:
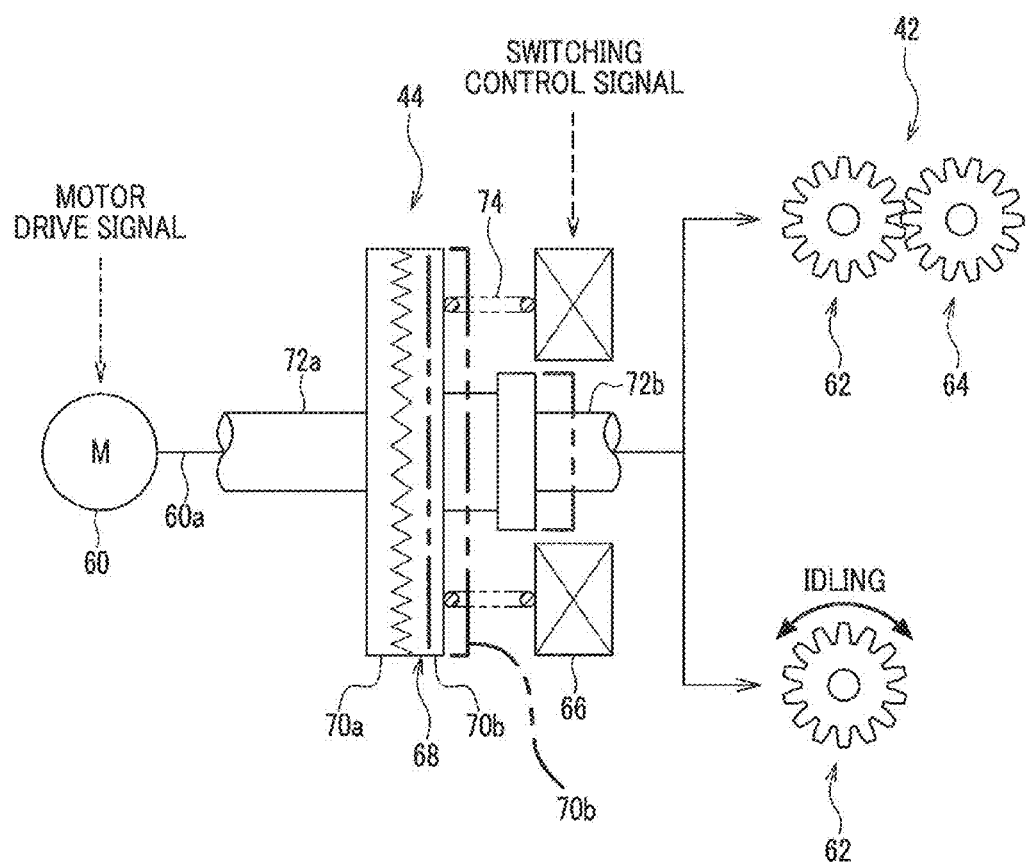
FIG. 3 is a schematic diagram showing a configuration of a drive mechanism for rotating a rotating shaft and a switching mechanism for switching between a rotatable state and a non-rotatable state of the rotating shaft.
Figure 4:
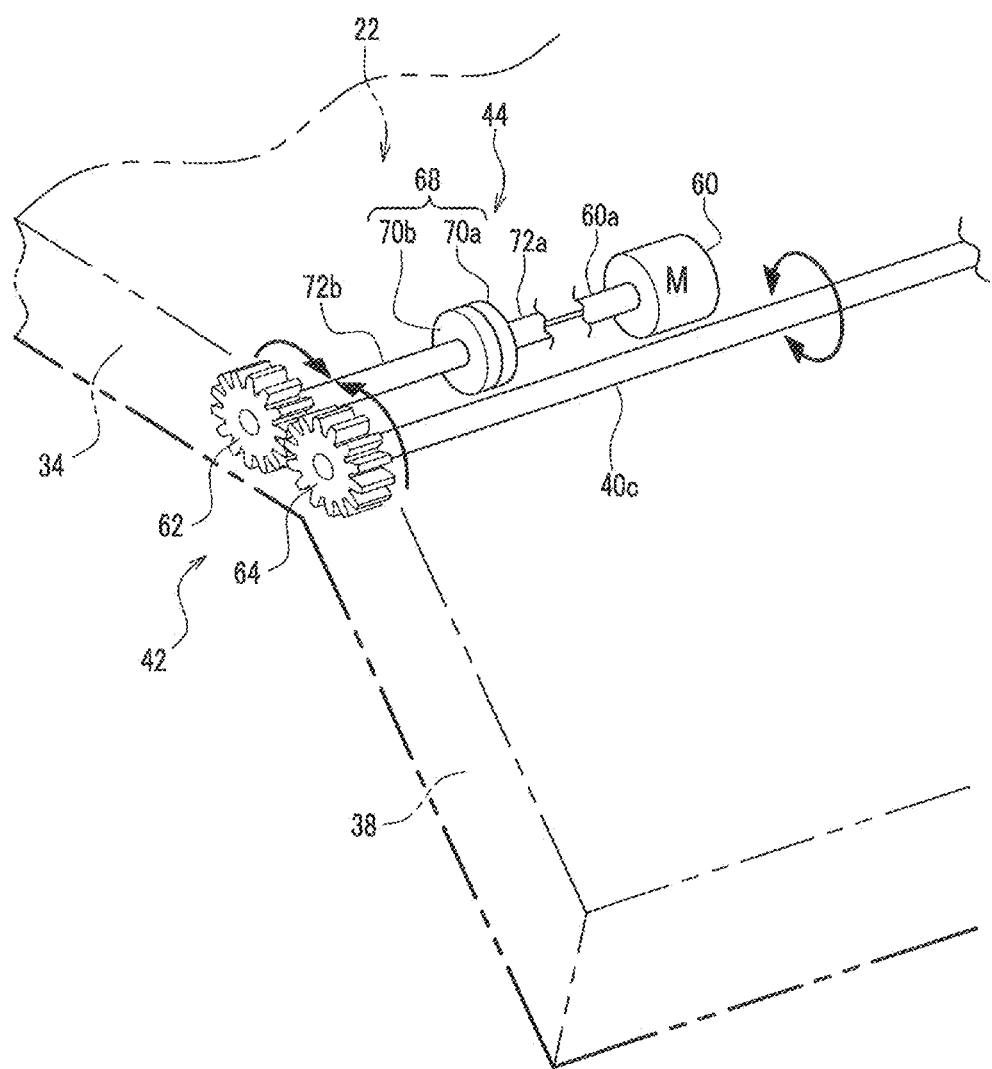
FIG. 4 is a schematic structural perspective view showing a state in which the drive mechanism and the switching mechanism are applied to a third rotating shaft.

FIG. 3 is a schematic diagram showing a configuration of a drive mechanism for rotating a rotating shaft and a switching mechanism for switching between a rotatable state and a non-rotatable state of the rotating shaft, and FIG. 4 is a schematic structural perspective view showing a state in which the drive mechanism and the switching mechanism are applied to a third rotating shaft.

As shown in FIGS. 3 and 4, the drive mechanism 42 includes a motor 60 for rotating a motor shaft 60*a* in the forward or reverse direction by a battery (not shown) as a power supply, a driving gear 62 which is connected to the motor 60 side via the switching mechanism 44, and a driven gear 64 which is connected to the first to third rotating shafts 40*a* to 40*c* and is arranged to be able to mesh with the driving gear 62.

As shown in FIG. 3, the switching mechanism 44 is configured, for example, as an electromagnetic clutch 68 which is attached with a solenoid 66. The clutch 68 includes the solenoid 66 which is wound with a layered coil, a pair of disc-shaped clutch plates 70*a*, 70*b* which are arranged to be able to be coupled to each other or to be spaced from each other while concave-convex surfaces thereof are opposed to each other, a pair of shafts 72*a*, 72*b* which are respectively connected to center portions of the pair of clutch plates 70*a*, 70*b*, and a spring member 74 which connects one clutch plate 70*a* and the other clutch plate 70*b* by depressing the other clutch plate 70*b* by a spring force. Note that, the other clutch plate 70*b* in close proximity to the solenoid 66 is adapted to function as a movable iron core (armature) which is attracted to the solenoid 66.

The one clutch plate 70*a* is connected to the motor shaft 60*a* via a coupling member (not shown), and the other clutch plate 70*b* is connected to the driving gear 62 via the shaft 72*b*. In an ON state of the clutch 68 in which the one clutch plate 70*a* and the other clutch plate 70*b* are coupled to each other, when the solenoid 66 is energized to generate an electromagnetic force by excitation, the other clutch plate 70*b* is attracted to the solenoid 66 side by the electromagnetic force. Since the other clutch plate 70*b* is attracted to the solenoid 66 side, the other clutch plate 70*b* is spaced from the one clutch plate 70*a* by a predetermined distance, and the clutch 68 is in an OFF state. Since the clutch 68 is in the OFF state, the first to third rotating shafts 40*a* to 40*c* are in a free state, and each plate constituting the slope 22 can be rotated manually.

In the ON state of the clutch 68, the driving gear 62 and the driven gear 64 are meshed with each other, and a rotation driving force by the energized motor 60 is transmitted to the third rotating shaft 40*c*, so that the third rotating shaft 40*c* is rotated in a predetermined direction. In contrast, in the OFF state of the clutch 68, the driving gear 62 is spaced from the driven gear 64 to be in a non-meshed state (the driving gear 62 is in an idling state), and the rotation driving force by the energized motor 60 is interrupted not to be transmitted to the third rotating shaft 40*c*.

Figure 5:
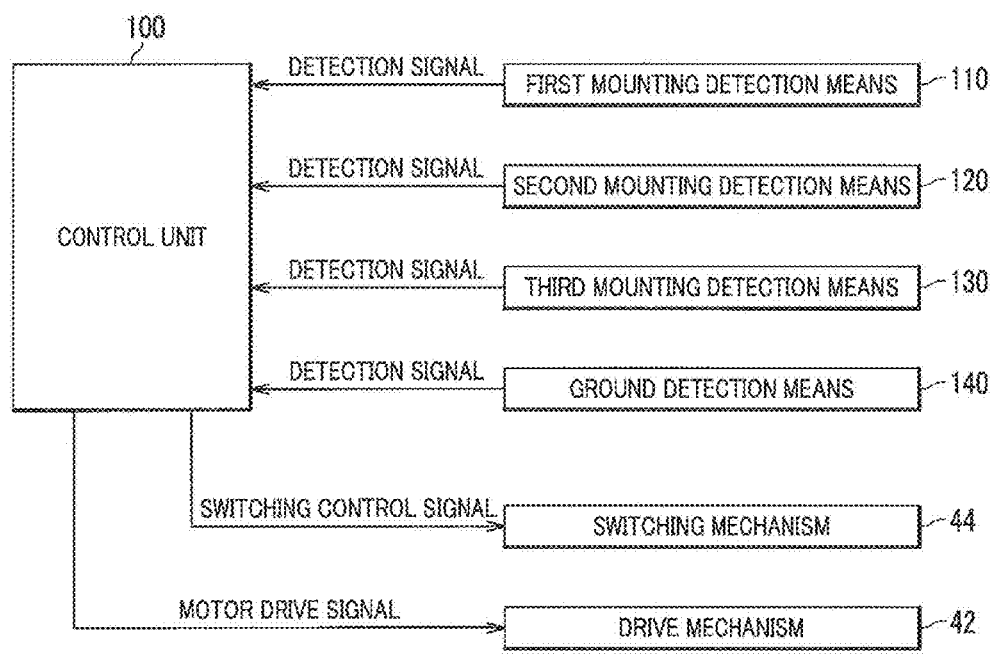
FIG. 5 is a block diagram showing connection relationship with a control unit.

Next, a control unit 100 arranged on the floor surface of the vehicle 16 will be described. FIG. 5 is a block diagram showing connection relationship with a control unit.

As shown in FIG. 5, to the control unit (control means) 100, respectively connected a first mounting detection means 110 which detects a mounted state or a non-mounted state of the wheelchair 26 with respect to the main plate 34, a second mounting detection means 120 which detects a mounted state or a non-mounted state of the wheelchair 26 with respect to the ground side plate 38, a third mounting detection means 130 which detects a mounted state or a non-mounted state of the wheelchair 26 with respect to the vehicle side plate 36, and a ground detection means 140 which detects whether or not an end (another end) on the vehicle rear side of the ground side plate 38 is in contact with the ground surface 20.

Further, the control unit 100 is electrically connected to the switching mechanism 44, and controls switching between the ON state (rotatable state of the first to third rotating shafts 40*a* to 40*c*) and the OFF state (non-rotatable state of the first to third rotating shafts 40*a* to 40*c*) of the clutch 68, by transmitting a switching control signal (an electrical signal) to the solenoid 66 of the switching mechanism 44. Further, the control unit 100 is electrically connected to the drive mechanism 42, and controls driving of the motor 60 by transmitting a motor drive signal to the motor 60 of the drive mechanism 42.

As shown in FIGS. 1 and 2, the first mounting detection means 110 is composed of a rotation angle sensor such as a rotary encoder which is provided in the drum (not shown) of the electric winch 30. The rotation angle sensor detects a rotation angle of the drum to detect a winding amount (pulling amount) of the belt 32 by the drum, and thus detects the mounted state or the non-mounted state of the wheelchair 26 with respect to the main plate 34 (the position of the wheelchair 26 on the slope 22).

Note that, the first mounting detection means 110 is not limited to the rotation angle sensor, and for example, it may be configured such that a pair of optical sensors composed of a light emitting element and a light receiving element are arranged to face each other respectively on both sides of the main plate 34, and the first mounting detection means 110 detects the mounted state of the wheelchair 26 by detecting blocking of a light emitted from the light emitting element to the light receiving element due to the wheelchair 26 which moves onto the main plate 34. Further, it may be configured such that a weight sensor (strain gauge; not shown) is provided in the main plate 34, and the first mounting detection means 110 detects the mounted state of the wheelchair 26 by detecting an amount of strain generated by the wheelchair 26 which moves onto the main plate 34. Further, it may be configured such that a capacitive sensor (capacitive proximity sensor; not shown) is provided in the main plate 34, and when the cared person 24 sitting in the wheelchair 26 approaches electrodes (not shown) provided in the capacitive sensor, the first mounting detection means 110 detects the mounted state of the wheelchair 26 by detecting an increase of capacitance of the electrodes. Furthermore, a plurality of piezoelectric elements (piezo elements) may be arranged in a matrix on the slope 22.

The second mounting detection means 120 is composed of a weight sensor (strain gauge) which is arranged in the ground side plate 38 or flush with an upper surface of the ground side plate 38. The mounted state of the wheelchair 26 is detected by detecting the amount of strain due to the wheelchair 26 which moves onto the ground side plate 38 by the weight sensor. Note that, the second mounting detection means 120 is not limited to the weight sensor or the like, and for example, it may be configured such that a pair of optical sensors composed of a light emitting element and a light receiving element are arranged to face each other on both sides in the vehicle width direction of the ground side plate 38, and the second mounting detection means 120 detects the mounted state of the wheelchair 26 by detecting blocking of a light emitted from the light emitting element to the light receiving element due to the wheelchair 26 which moves onto the ground side plate 38. Further, it may be configured such that a capacitive sensor (capacitive proximity sensor; not shown) is provided in the ground side plate 38, and when the cared person 24 sitting in the wheelchair 26 approaches electrodes (not shown) provided in the capacitive sensor, the second mounting detection means 120 detects the mounted state of the wheelchair 26 by detecting an increase of capacitance of the electrodes. Furthermore, the plurality of piezoelectric elements (piezo elements) may be arranged in a matrix on the slope 22.

The third mounting detection means 130 is composed of a weight sensor (strain gauge) which is arranged in the vehicle side plate 36 or flush with an upper surface of the vehicle side plate 36. The mounted state of the wheelchair 26 is detected by detecting the amount of strain due to the wheelchair 26 which moves onto the vehicle side plate 36 by the weight sensor. Note that, the third mounting detection means 130 is not limited to the weight sensor or the like, and for example, it may be configured such that a pair of optical sensors composed of a light emitting element and a light receiving element are arranged to face each other on both sides in the left-right direction of the vehicle side plate 36, and the third mounting detection means 130 detects the mounted state of the wheelchair 26 by detecting blocking of a light emitted from the light emitting element to the light receiving element due to the wheelchair 26 which moves onto the vehicle side plate 36. Further, it may be configured such that a capacitive sensor (capacitive proximity sensor; not shown) is provided in the vehicle side plate 36, and when the cared person 24 sitting in the wheelchair 26 approaches electrodes (not shown) provided in the capacitive sensor, the third mounting detection means 130 detects the mounted state of the wheelchair 26 by detecting an increase of capacitance of the electrodes. Furthermore, the plurality of piezoelectric elements (piezo elements) may be arranged in a matrix on the slope 22.

The ground detection means 140 is composed of, for example, a limit switch which is arranged below the rear end portion of the ground side plate 38. A grounded state is detected by a contact of a detection element provided in the limit switch with the ground surface 20. Note that, the ground detection means 140 is not limited to the limit switch, and for example, a non-contact sensor such as a reflective optical sensor may be used.

The control unit 100 includes, for example, a CPU, a RAM, a ROM, and an input/output circuit, and performs a control by performing various kinds of arithmetic processing based on inputs of detection signals from the respective detection means, and data and programs stored in the ROM.

Figure 8:
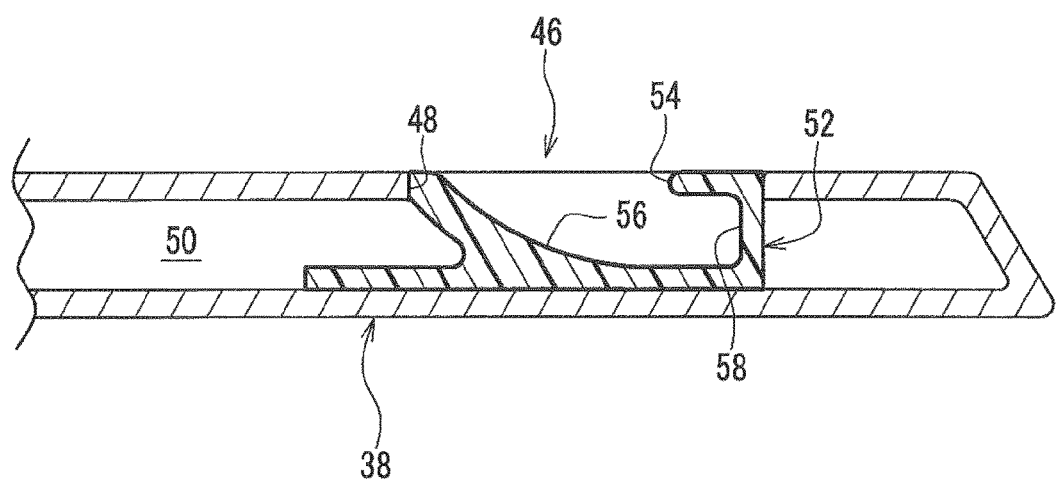
FIG. 8 is a vertical sectional view taken along line VIII-VIII in FIG. 6.

FIG. 8 is a vertical sectional view taken along line VIII-VIII in FIG. 6. On the upper surface of the ground side plate 38, a pair of left and right grip portions 46 which is gripped, for example, by a support person (an operator) or the like, is provided. As shown in FIG. 8, each grip portion 46 includes a casing 52 which is inserted through a rectangular opening 48 of the ground side plate 38 to be housed in a hollow portion 50. The casing 52 includes an engaging projection 54 which projects along the upper surface of the ground side plate 38, a curved portion 56 having a curved surface which is gradually curved toward a lower surface from the upper surface of the ground side plate 38, and a vertical wall 58 which connects the engaging projection 54 and the curved portion 56.

Figure 7:
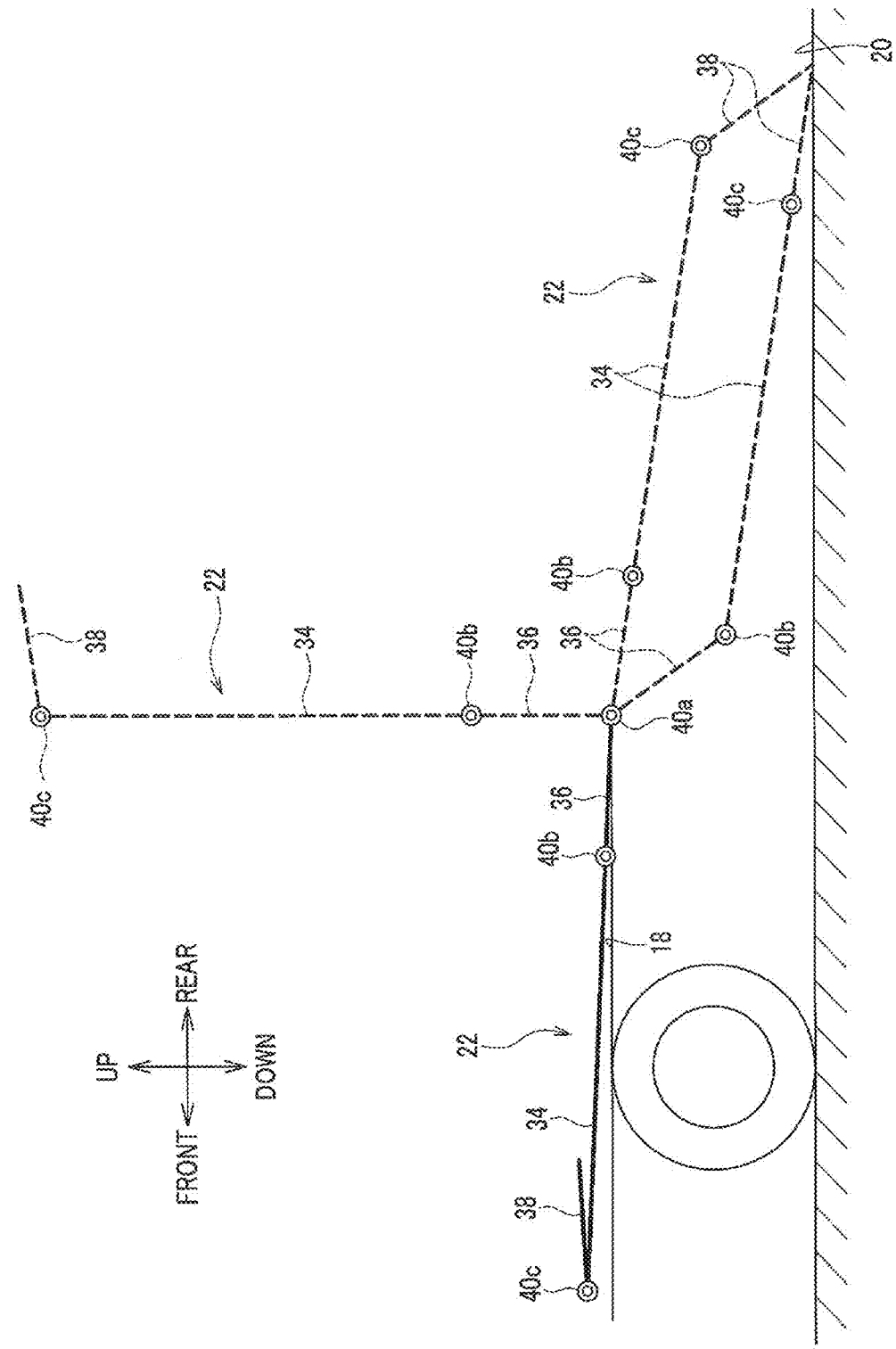
FIG. 7 is a schematic diagram showing the grounded state, the upright stationary state, and the housed state of the slope.

FIG. 6 is an explanatory view showing a housed state of the slope in a vehicle compartment, an upright stationary state of the slope, and a grounded state in which the slope is moved outside the vehicle and another end of the slope is in contact with the ground surface, and FIG. 7 is a schematic diagram showing each state described above.

After moving the slope 22 outside the vehicle from the housed state via the upright stationary state thereof, the slope 22 is in the grounded state in which the other end in the vehicle front-rear direction of the slope 22 is in contact with the ground surface 20. In the housed state of the slope 22 in the vehicle compartment, the main plate 34 and the vehicle side plate 36 are in a substantially horizontal state, while the ground side plate 38 is in a state of being folded starting from the third rotating shaft 40c at an acute angle with respect to the main plate 34 and the vehicle side plate 36. In this housed state, as shown in FIG. 6, since the pair of grip portions 46 is provided in a position close to the vehicle body rear opening 12 (see FIG. 1) on the upper surface of the ground side plate 38, the support person is able to grip the grip portions 46 from outside the vehicle through the vehicle body rear opening 12, to easily ground the slope 22, for example, without entering into the vehicle compartment.

The mounting device 10 according to the present invention is basically constructed as described above, and its operation and effects will be described below.

Figure 9:
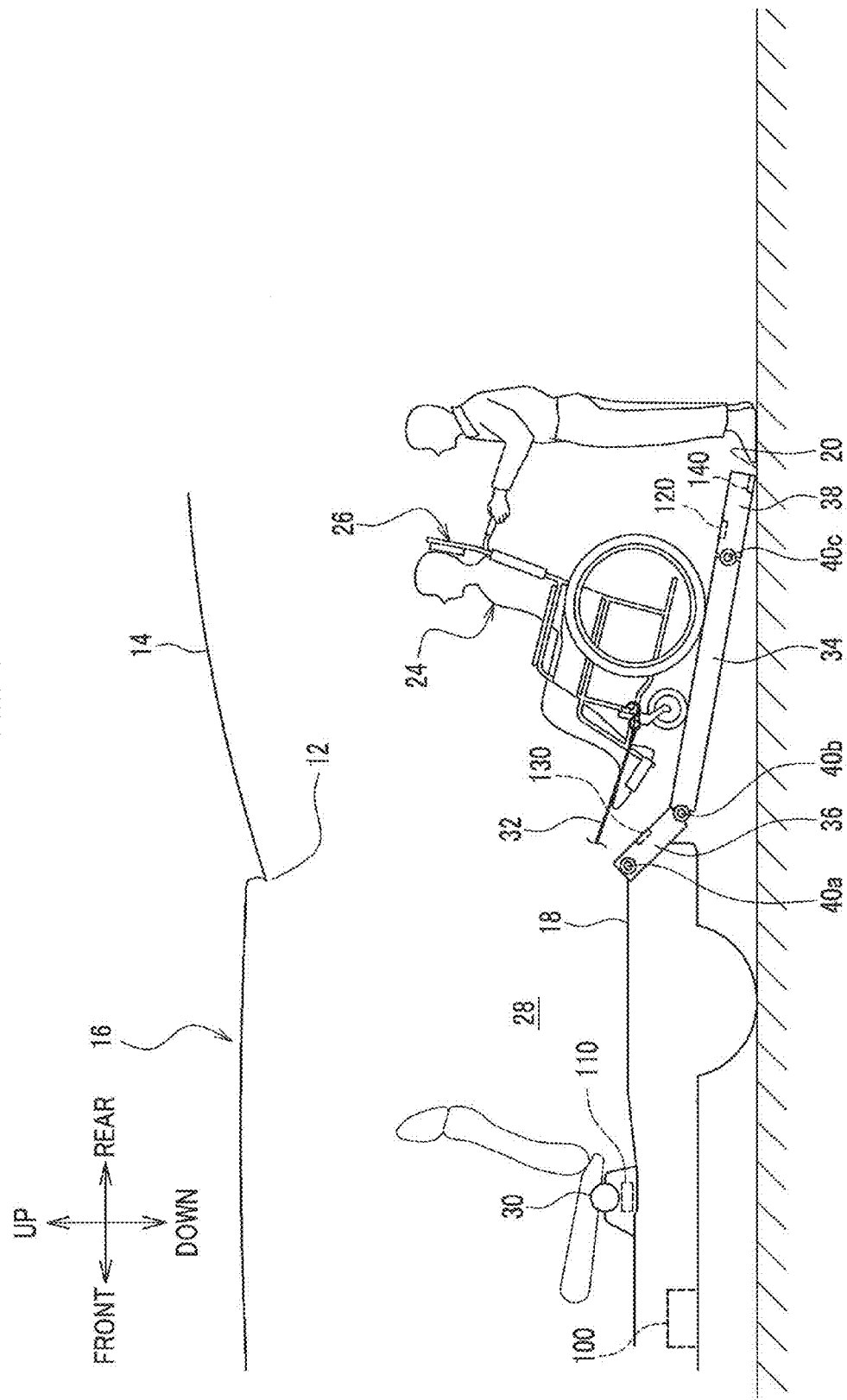
FIG. 9 is a side view showing a state in which a wheelchair is mounted on a main plate in a low position after the wheelchair moves from a state shown in FIG. 1.
Figure 10:
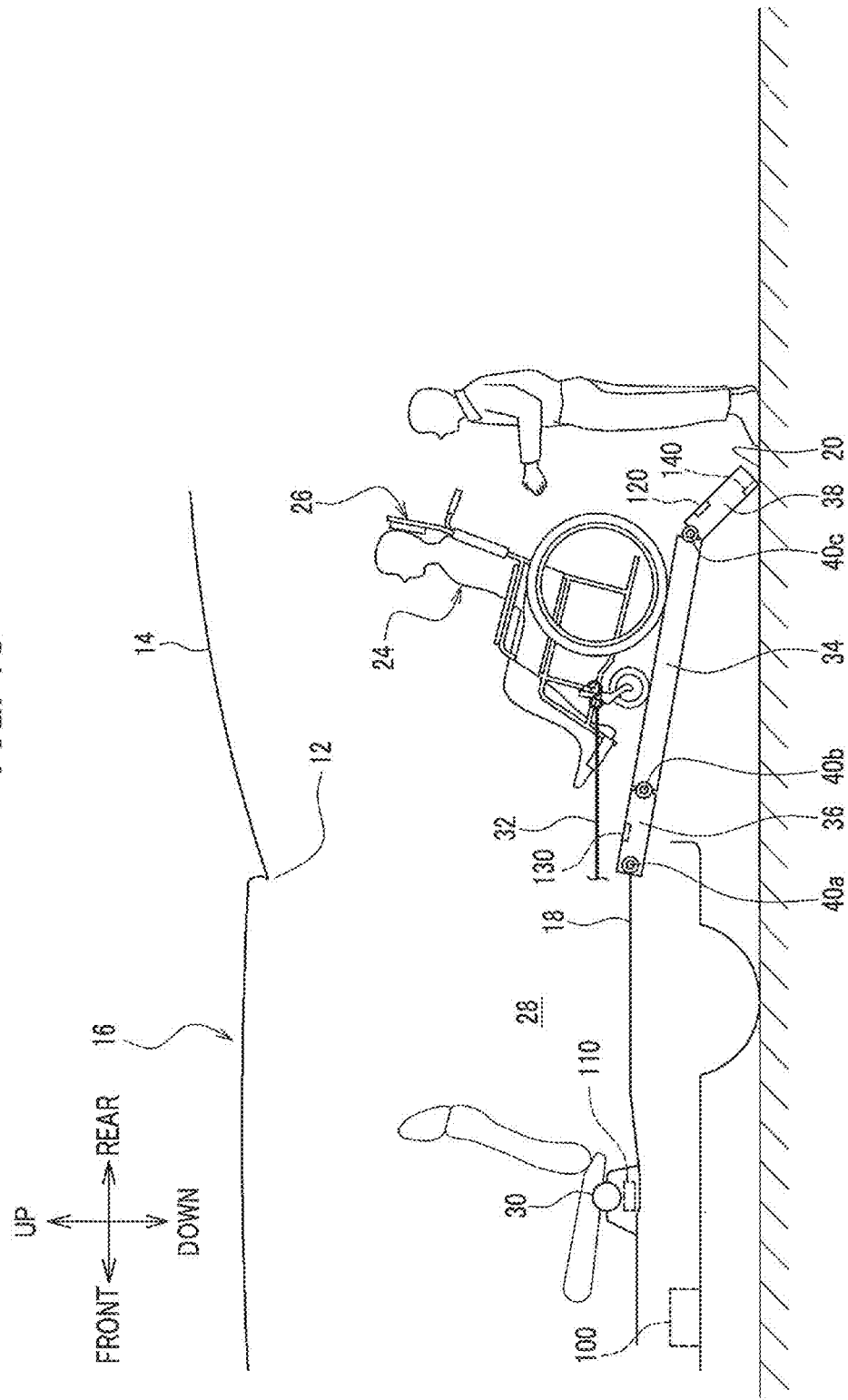
FIG. 10 is a side view showing a state in which the main plate is displaced to a high position from the low position while the wheelchair is mounted on the main plate.
Figure 11:
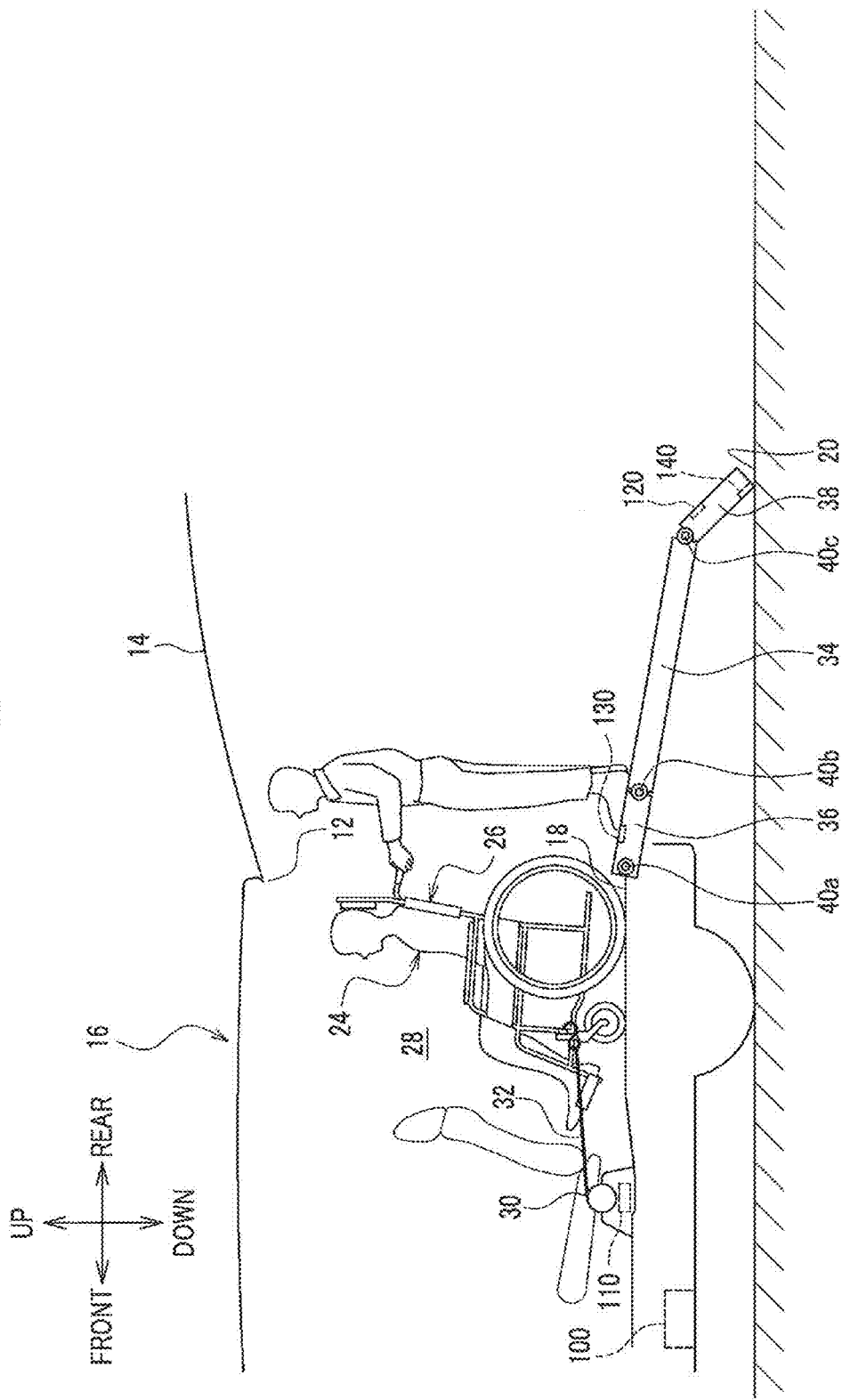
FIG. 11 is a side view showing a state in which the wheelchair has moved to reach a rear compartment space.

FIG. 9 is a side view showing a state in which a wheelchair is mounted on a main plate in a low position after the wheelchair moves from a state shown in FIG. 1, FIG. 10 is a side view showing a state in which the main plate is displaced to a high position from the low position while the wheelchair is mounted on the main plate, and FIG. 11 is a side view showing a state in which the wheelchair has moved to reach a rear compartment space.

First, as shown in FIG. 1, the slope 22 housed in the vehicle compartment is moved outside the vehicle, to be bridged between the vehicle body and the ground surface 20 so that the main plate 34 is in the low position in the up-down direction. In the low position, the axial line in the vehicle front-rear direction of the main plate 34 and the axial line in the vehicle front-rear direction of the ground side plate 38 are set in a horizontal state, while the axial line in the vehicle front-rear direction of the vehicle side plate 36 is set in the state of being inclined downwardly at the predetermined angle to the main plate 34 side (the rear side of the vehicle).

Subsequently, in a state where the slope 22 (main plate 34) is in the low position, for example, the support person activates the electric winches 30 by remote control to wind up by the drum (not shown) the belt 32 which is engaged with the wheelchair 26, and thus the cared person 24 is moved to the vehicle body side along the slope 22 while sitting in the wheelchair 26. As shown in FIG. 9, when the wheelchair 26 is in a mounted state on the main plate 34, a winding operation of the drum of the electric winch 30 is stopped under control of the control unit 100.

Subsequently, as shown in FIG. 10, for example, by a signal of remote control by the cared person, the control unit 100 rotates the first to third rotating shafts 40a to 40c respectively in a predetermined direction, to switch the main plate 34 from the state of the low position to the state of the high position, while holding a state in which the wheelchair 26 is mounted on the main plate 34. In other words, the control unit 100 rotates the first rotating shaft 40*a* and the second rotating shaft 40*b* in the predetermined direction, so that the axial line in the vehicle front-rear direction of the vehicle side plate 36 and the axial line in the vehicle front-rear direction of the main plate 34 are in a horizontal state. At the same time, the control unit 100 rotates the third rotating shaft 40*b*, so that the axial line in the vehicle front-rear direction of the ground side plate 38 is in a state of being inclined downwardly at a predetermined angle to the rear side of the vehicle. In addition, an operation of the support system when switching the main plate 34 to the low position from the high position will be described later.

At the end, while maintaining a state in which the main plate 34 in the high position is mounted with the wheelchair 26, the electric winch 30 is activated again by remote control by the cared person to start winding of the belt 32, and the support person presses the wheelchair 26 to the vehicle body side along the slope 22, and thus the wheelchair 26 can be got on a position of the rear compartment space 28 (see FIG. 11). Note that, the winding of the belt 32 of the electric winch 30 is stopped when the wheelchair 26 reaches the position of the rear compartment space 28.

In a case where the wheelchair 26 in which the cared person sits is got off from the rear compartment space 28, the operation is opposite to the above-described operation, and the wheelchair 26 can be easily got off by switching the main plate 34 of the slope 22 to the low position from the high position. Further, by putting the slope 22 in the housed state from the grounded state via the upright stationary state while the support person grips the grip portions 46, the slope 22 can be easily housed in the vehicle compartment.

Figure 12:
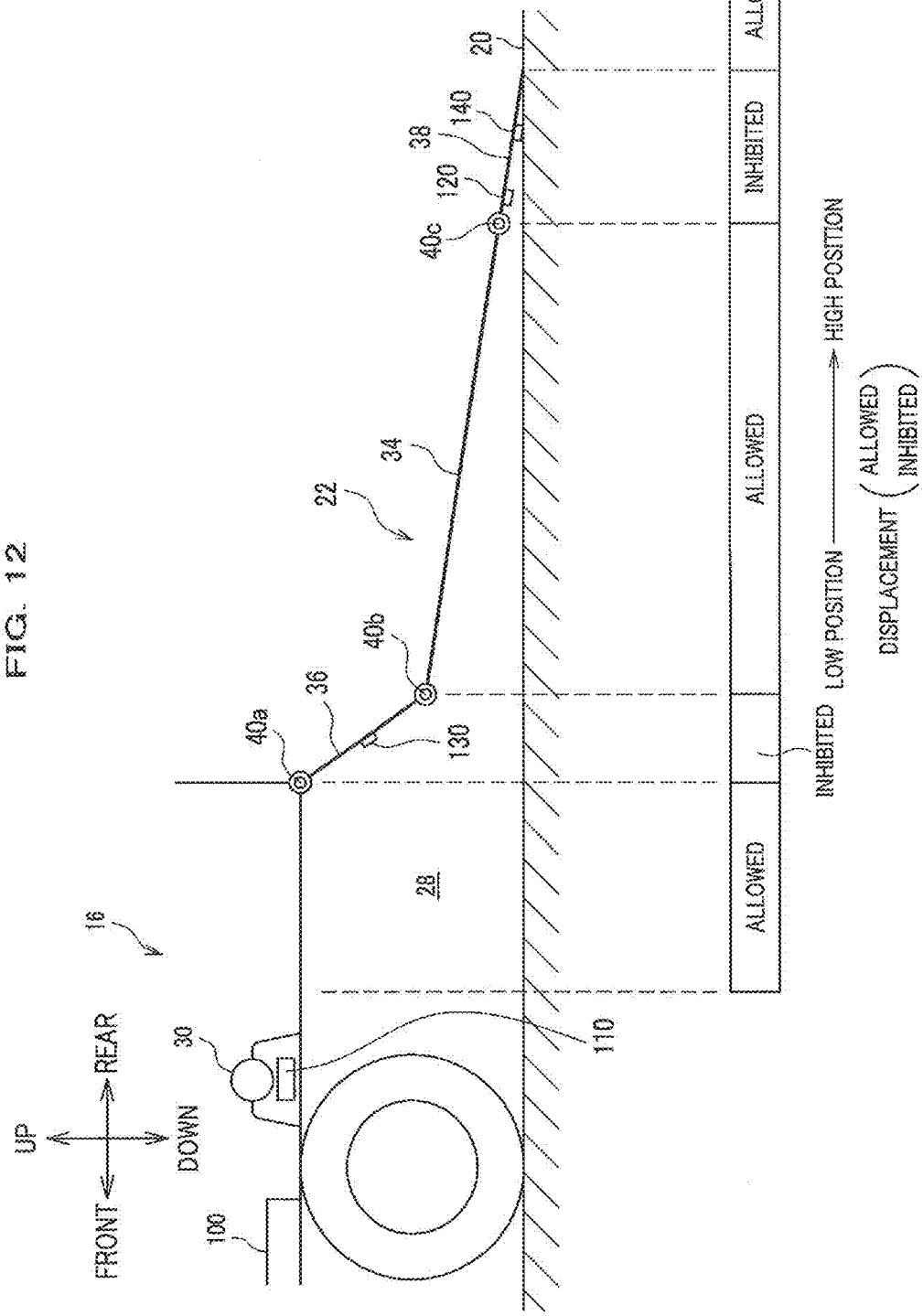
FIG. 12 is a diagram for describing an operation of a support system when switching the slope to the high position from the low position.
Figure 13:
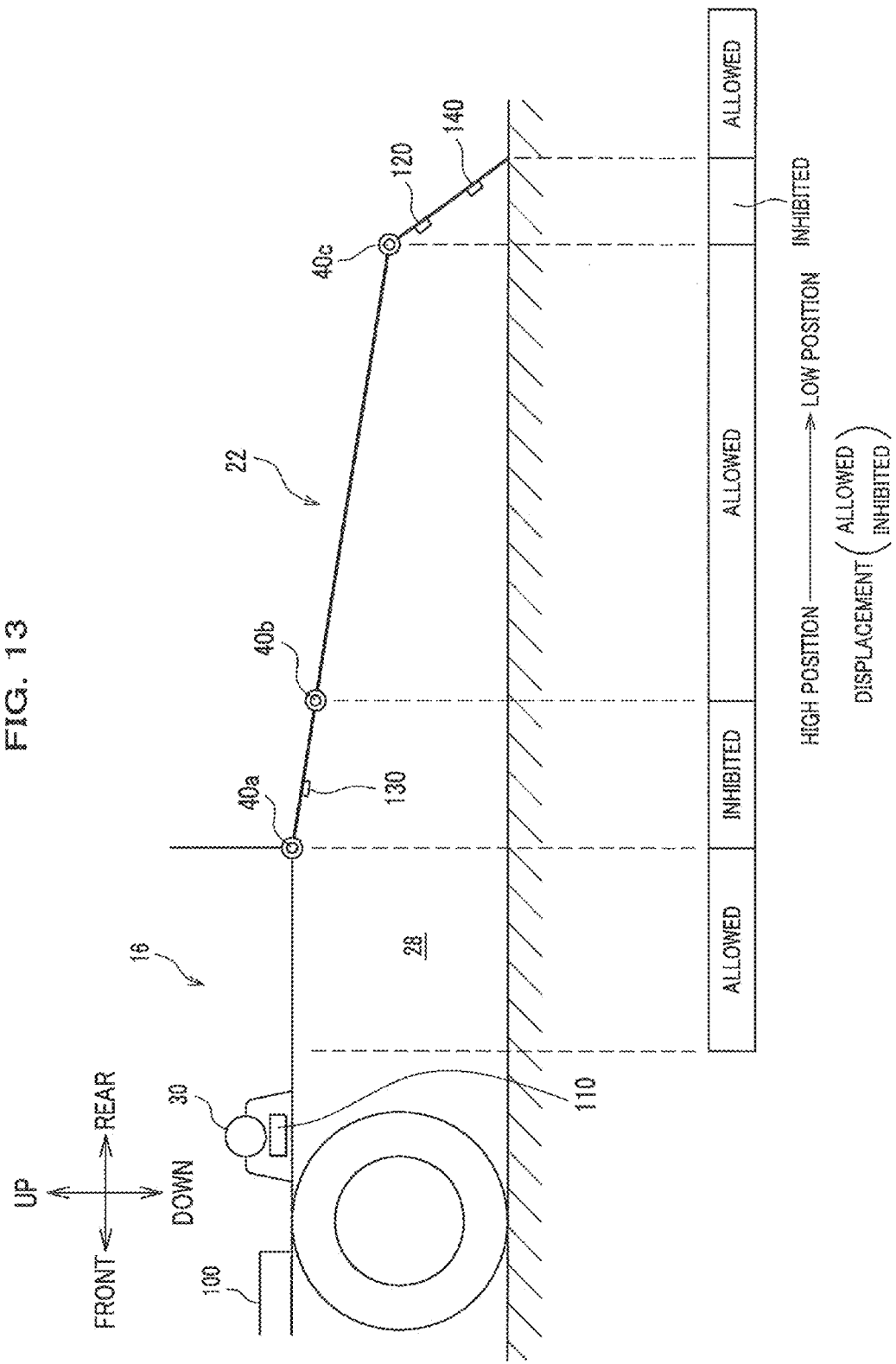
FIG. 13 is a diagram for describing an operation of the support system when switching the slope to the low position from the high position.

Next, the operation of the support system when switching (changing a position of) the slope 22 between the low position and the high position (from the low position to the high position, from the high position to the low position) will be described. FIG. 12 is a diagram for describing the operation of the support system when switching the slope to the high position from the low position, and FIG. 13 is a diagram for describing the operation of the support system when switching the slope to the low position from the high position.

In the present embodiment, in a case where the first mounting detection means 110 detects that the wheelchair 26 is in the mounted state on the main plate 34, to transmit a detection signal of the mounted state to the control unit 100, and both the second mounting detection means 120 and the third mounting detection means 130 transmit detection signals of the non-mounted state to the control unit 100, the displacement of the slope 22 is allowed by the control unit 100, because the wheelchair 26 is securely mounted on the main plate 34.

In other words, the control unit 100 allows the displacement of the slope 22 by detecting all the three signals, i.e., the signal of the mounted state by the first mounting detection means 110, the signal of the non-mounted state by the second mounting detection means 120, and the signal of the non-mounted state by the third mounting detection means 130. Consequently, in the present embodiment, it is possible to stably displace the slope 22 in a state where the wheelchair 26 is securely mounted on a predetermined position (mounted only on the main plate 34), as well as to improve the convenience.

Further, in the present embodiment, the control unit 100 may allow the displacement of the slope 22 when the first mounting detection means 110 detects that the wheelchair 26 is in the mounted state on the main plate 34. By a detection signal of the non-mounted state which is transmitted from the first mounting detection means 110, the displacement of the slope 22 in a state where the wheelchair 26 is not mounted on the main plate 34 is inhibited (not allowed) by the control unit 100. Therefore, the displacement in a state where the wheelchair 26 is mounted on a site other than the main plate 34 which is the predetermined position can be suitably avoided. As a result, it is possible to displace the wheelchair 26 smoothly and stably on the slope 22 in the state where the wheelchair 26 is securely mounted on the predetermined position (mounted only on the main plate 34).

Further, in the present embodiment, as shown in FIG. 12, when the main plate 34 constituting the slope 22 is in the low position, in a state where the first mounting detection means 110 detects that the wheelchair 26 is mounted on the main plate 34 to transmit the signal of the mounted state to the control unit 100, and the second mounting detection means 120 detects that the wheelchair 26 is not mounted on the ground side plate 38 to transmit the signal of the non-mounted state to the control unit 100, the control unit 100 may allow the displacement of the slope 22. Consequently, in the present embodiment, it is possible to stably displace the slope 22 (move the slope 22 upwardly in a parallel fashion) in the state where the wheelchair 26 is securely mounted on the predetermined position (mounted only on the main plate 34).

Further, in the present embodiment, as shown in FIG. 13, when the main plate 34 constituting the slope 22 is in the high position, in a state where the first mounting detection means 110 detects that the wheelchair 26 is mounted on the main plate 34 to transmit the signal of the mounted state to the control unit 100, and the third mounting detection means 130 detects that the wheelchair 26 is not mounted on the vehicle side plate 36 to transmit the signal of the non-mounted state to the control unit 100, the control unit 100 may allow the displacement of the slope 22. Consequently, in the present embodiment, it is possible to stably displace the slope 22 (move the slope 22 downwardly in a parallel fashion) in the state where the wheelchair 26 is securely mounted on the predetermined position (mounted only on the main plate 34).

Further, in the present embodiment, the ground detection means 140 detects that the other end on the vehicle rear side of the ground side plate 38 is in contact with the ground surface 20, and thus it is reliably detected that the slope 22 is bridged between the vehicle body and the ground surface 20. Consequently, in the present embodiment, the displacement of the slope 22 is allowed when it is reliably detected that the slope 22 is bridged between the vehicle body and the ground surface 20, and the displacement of the slope 22 is not allowed when the slope 22 is not bridged between the vehicle body and the ground surface 20, and thus the slope 22 can be stably displaced.

Further, in the present embodiment, when the displacement of the slope 22 is allowed by the control unit 100 based on each detection signal, the clutch 68 of the switching mechanism 44 can easily switch between the rotatable state of the first to third rotating shafts 40*a* to 40*c* (ON state of the clutch 68) and the non-rotatable state of the first to third rotating shafts 40*a* to 40*c* (OFF state of the clutch 68). Consequently, in the present embodiment, it is possible to stably displace the slope 22 as well as to improve the convenience.

Further, in the present embodiment, it is possible to move the main plate 34 in a parallel fashion in the up-down direction between the low position and the high position, while maintaining the inclination angle of the main plate 34 at the predetermined angle. Therefore, in the present embodiment, it is possible to stably displace (change a position of) the main plate 34 constituting the slope 22 between the low position and the high position, without moving the other end of the ground side plate 38 which is in contact with the ground surface 20. In other words, it is possible to move the main plate 34 in a parallel fashion in the up-down direction between the low position and the high position, while constantly maintaining a posture of the cared person 24 sitting in the wheelchair 26 (object to be mounted) or maintaining a stationary state of the wheelchair 26. Consequently, in the present embodiment, it is possible to suitably avoid a load applied to the main plate 34 during the displacement of the main plate 34, without generating a frictional force between the ground surface 20 and the other end of the ground side plate 38.

Further, for example, in a case where the slope 22 is provided in a vehicle 10, in which an opening ground clearance of the tailgate (back door 14) at a rear portion of the vehicle body is high, such as an electric vehicle or a hybrid vehicle provided with a battery or the like on a floor surface thereof, it is possible to allow the wheelchair 26 to get on or get off the vehicle at a low load, without increasing an inclination angle of the slope 22 or increasing a front-rear length of the slope 22.

Further, since it is not necessary to increase the front-rear length of the slope 22, it is possible to reduce an expansion space of the slope 22 in the grounded state, thereby improving the convenience. Consequently, in the present embodiment, it is possible to make the slope 22 lightweight and inexpensive by making itself a simple structure, while the slope 22 can be also suitably applied to the vehicle 10 having a high opening ground clearance by stably displacing (changing the position of) the main plate 34 mounted with the wheelchair 26 between the low position and the high position.

Further, in the present embodiment, it is possible to allow the wheelchair 26 to get on the vehicle at a lower load by attaching the electric winch 30, thereby avoiding an increase in size of the electric winch 30 by reducing a lifting force for the wheelchair 26 by the electric winch 30. Further, in the present embodiment, it is possible to reduce the length of the belt 32 which is wound by the electric winch 30 by reducing the front-rear length of the slope 22. As a result, it is possible to achieve a reduction in size of the electric winch 30 by reducing a diameter of the drum of the electric winch 30.

Further, in the present embodiment, when the size L1 of the vehicle side plate 36 in the direction (vehicle front-rear direction) perpendicular to the first to third rotating shafts 40a to 40c and the size L2 of the ground side plate 38 in the direction (vehicle front-rear direction) perpendicular to the first to third rotating shafts 40a to 40c are set to be equal to each other (L1=L2), the main plate 34 can be displaced (positionally changed) between the low position and the high position in the state of maintaining the angle of the main plate 34 at the predetermined angle. Therefore, it is possible to improve stability of the wheelchair 26 during the displacement (position change) of the main plate 34.

Further, in the present embodiment, when the size L3 of the main plate 34 in the direction (vehicle front-rear direction) perpendicular to the first to third rotating shafts 40a to 40c is set to be larger than the size L1 of the vehicle side plate 36 and the size L2 of the ground side plate 38 in the direction (vehicle front-rear direction) perpendicular to the first to third rotating shafts 40a to 40c (L3>L1, L2), it is possible to largely ensure a mountable range in which the wheelchair 26 can be stably displaced (positionally changed), thereby improving the stability of the wheelchair 26 during the displacement of the slope 22.

In a case where the above-described relationship of L3>L1, L2 is not satisfied, there is a possibility that the slope 22 (main plate 34) is displaced, for example, in a state where the wheelchair 26 is mounted on the main plate 34 and the vehicle side plate 36, across the second rotating shaft 40b, or in a state where the wheelchair 26 is mounted on the main plate 34 and the ground side plate 38, across the third rotating shaft 40c. When the wheelchair 26 is displaced in a state where the wheelchair 26 is mounted across the second rotating shaft 40b or the third rotating shaft 40c, there is a possibility that a smooth displacement of the wheelchair 26 on the slope 22 in a state where the wheelchair 26 is mounted only on the main plate 34 is impaired.

Further, in the present embodiment, when the total (L1+L2+L3) of the size L1 of the vehicle side plate 36, the size L3 of the main plate 34, and the size L2 of the ground side plate 38 is set to be larger than the size LV of the virtual straight line S which connects the ground surface 20 and the axial center of the first rotating shaft 40a provided between the vehicle body and the vehicle side plate 36 ((L1+L2+L3)>LV), the slope 22 can be displaced without moving the other end of the ground side plate 38 which is in contact with the ground surface 20.

When the slope 22 is displaced in a state where the slope 22 is set in a relationship of (L1+L2+L3)=LV or (L1+L2+L3)<LV, it is necessary to move the other end of the ground side plate 38 in a direction toward or away from the vehicle body, and the frictional force is generated between the ground surface 20 and the other end of the ground side plate 38. As a result, there is a problem that an extra load is applied to the slope 22 during the displacement of the slope 22, or the ground surface 20 or the other end of the ground side plate 38 is damaged by the generated friction force.

Further, in the present embodiment, since there is no angle difference between the main plate 34 and the ground side plate 38 when moving the wheelchair 26 between the ground (road surface) and the slope 22 in the low position, it is possible to smoothly move the wheelchair 26 to the main plate 34 from the ground side plate 38 when the wheelchair 26 gets on the vehicle, and to smoothly move the wheelchair 26 to the ground side plate 38 from the main plate 34 when the wheelchair 26 gets off the vehicle.

Further, in the present embodiment, since there is no angle difference between the main plate 34 and the vehicle side plate 36 when moving the wheelchair 26 between the floor surface 18 of the vehicle body and the slope 22 in the high position, it is possible to smoothly move the wheelchair 26 to the vehicle side plate 36 from the main plate 34 when the wheelchair 26 gets on the vehicle, and to smoothly move the wheelchair 26 to the main plate 34 from the vehicle side plate 36 when the wheelchair 26 gets off the vehicle.

Further, in the present embodiment, in the housed state of the slope 22 in the vehicle compartment, since the grip portions 46 are located on the vehicle body rear opening 12 side at the upper surface of the ground side plate 38, it is possible to easily grip the slope 22 through the vehicle body rear opening 12.

Figure 14:
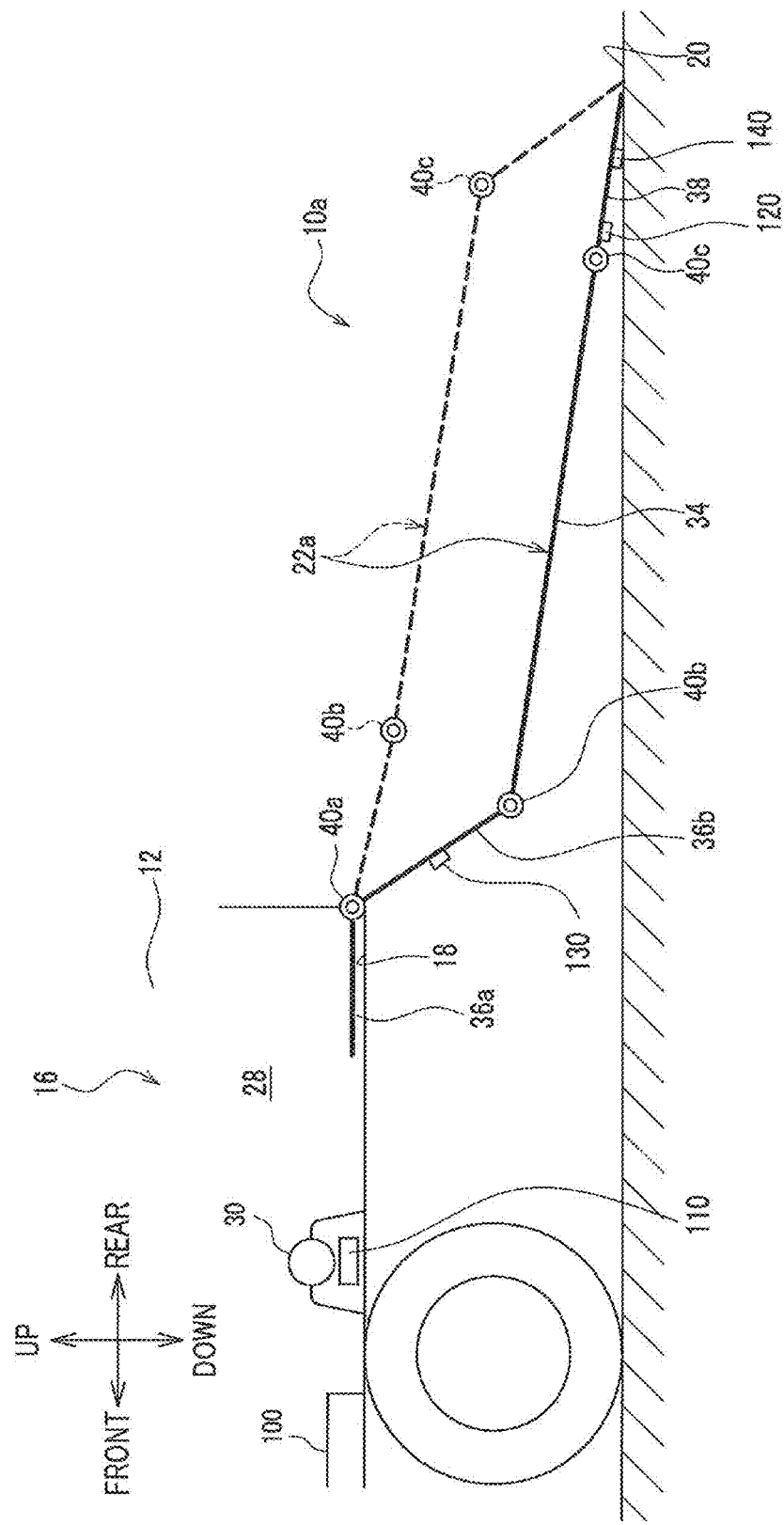
FIG. 14 is a schematic diagram of the slope and the vehicle mounted with the mounting device according to another embodiment of the present invention.

Subsequently, a mounting device 10a according to another embodiment of the present invention will be described below. FIG. 14 is a schematic diagram of the slope and the vehicle applied with the mounting device according to the other embodiment of the present invention. Note that, the same components as the embodiment shown in FIG. 2 are denoted by the same reference numerals, and the detailed description thereof will be omitted.

In the embodiment shown in FIG. 2, the vehicle side plate 36 disposed between the vehicle body and one end in the vehicle front-rear direction of the main plate 34 is made of a single plate, however, there is a difference in that the vehicle side plate 36 is composed of plural plates of a first vehicle side plate 36a and a second vehicle side plate 36b in the mounting device 10a according to the other embodiment.

The first vehicle side plate 36a is connected to a first rotating shaft 40a, and is provided on the floor surface 18 in the vehicle front direction from the first rotating shaft 40a. The second vehicle side plate 36b is connected to the first rotating shaft 40a, and is connected to the main plate 34 via the second rotating shaft 40b at a position on the vehicle rear side of the first rotating shaft 40a.

By arranging the first vehicle side plate 36a on the floor surface 18, it is possible to improve flexibility of a layout of the first rotating shaft 40a on the floor surface 18. In other words, the first rotating shaft 40a is not limited to a position (rearmost portion of the floor surface 18) of the vehicle rear opening 12, and for example, it may be arranged on the floor surface 18 located on the vehicle front side than the vehicle rear opening 12.

Note that, since other operation and effects of the other embodiment are the same as the above-described embodiment, the detailed description thereof will be omitted.

REFERENCE SIGNS LIST 10, 10a: mounting device (mounting device for object to be mounted)
16: vehicle
20: ground surface
22: slope
26: wheelchair (object to be mounted)
34: main plate
36, 36a, 36b: vehicle side plate
38: ground side plate
40a to 40c: rotating shaft
42: drive mechanism (drive means)
44: switching mechanism (switching means)
100: control unit (control means)
110: first mounting detection means
120: second mounting detection means
130: third mounting detection means
140: ground detection means

The invention claimed is:

1. A mounting device for an object to be mounted, comprising:
a main plate on which the object to be mounted is mounted;
a vehicle side plate which is provided between a vehicle body and one end of the main plate, and is composed of at least one plate;
a ground side plate which is provided between a ground surface and another end of the main plate opposite to the one end, and is composed of at least one plate;
a plurality of rotating shafts which are provided between the vehicle body and the vehicle side plate, and between the respective plates;
a drive means which rotates the rotating shafts;
a slope which is configured to include the main plate, the vehicle side plate, the ground side plate, and the plurality of rotating shafts, and in which the main plate is displaced between a low position and a high position by rotating the plurality of rotating shafts by the drive means; and
a control means which controls a displacement of the slope,
wherein the control means includes a first mounting detection means which detects a mounted state or a non-mounted state of the object to be mounted with respect to the main plate, and a second mounting detection means which detects a mounted state or a non-mounted state of the object to be mounted with respect to the ground side plate, and
wherein the control means allows the displacement of the slope when the first mounting detection means detects that the object to be mounted is in the mounted state on the main plate and the second mounting detection means detects that the object to be mounted is in the non-mounted state on the ground side plate.

2. A mounting device for an object to be mounted, comprising:
a main plate on which the object to be mounted is mounted;
a vehicle side plate which is provided between a vehicle body and one end of the main plate, and is composed of at least one plate;
a ground side plate which is provided between a ground surface and another end of the main plate opposite to the one end, and is composed of at least one plate;
a plurality of rotating shafts which are provided between the vehicle body and the vehicle side plate, and between the respective plates;
a drive means which rotates the rotating shafts;
a slope which is configured to include the main plate, the vehicle side plate, the ground side plate, and the plurality of rotating shafts, and in which the main plate is displaced between a low position and a high position by rotating the plurality of rotating shafts by the drive means; and
a control means which controls a displacement of the slope,
wherein the control means includes a first mounting detection means which detects a mounted state or a non-mounted state of the object to be mounted with respect to the main plate, a second mounting detection means which detects a mounted state or a non-mounted state of the object to be mounted with respect to the ground side plate, and a third mounting detection means which detects a mounted state or a non-mounted state of the object to be mounted with respect to the vehicle side plate, and
wherein the control means allows the displacement of the slope when the first mounting detection means detects that the object to be mounted is in the mounted state on the main plate and both the second mounting detection means detects that the object to be mounted is in the non-mounted state on the ground side plate and the third mounting detection means detects that the object to be mounted is in the non-mounted state on the vehicle side plate.

3. The mounting device for the object to be mounted according to claim 1,
wherein the control means includes a ground detection means which detects whether or not another end of the ground side plate is in contact with the ground surface, and
wherein the control means allows the displacement of the slope when the ground detection means detects that the other end of the ground side plate is in contact with the ground surface.

4. The mounting device for the object to be mounted according to claim 1, further comprising
   a switching means which switches between a rotatable state of the rotating shaft and a non-rotatable state of the rotating shaft,
   wherein the control means switches between an allowed state for allowing the displacement of the slope and an inhibited state for inhibiting the displacement of the slope by switching control of the switching means.

5. The mounting device for the object to be mounted according to claim 1, wherein the control means inhibits the displacement of the slope when the second mounting detection means detects that the object to be mounted is in the mounted state on the ground side plate.

6. The mounting device for the object to be mounted according to claim 1, wherein the displacement of the slope includes displacement of the main plate between the low position and the high position.

7. The mounting device for the object to be mounted according to claim 2,
   wherein the control means includes a ground detection means which detects whether or not another end of the ground side plate is in contact with the ground surface, and
   wherein the control means allows the displacement of the slope when the ground detection means detects that the other end of the ground side plate is in contact with the ground surface.

8. The mounting device for the object to be mounted according to claim 2, further comprising
   a switching means which switches between a rotatable state of the rotating shaft and a non-rotatable state of the rotating shaft,
   wherein the control means switches between an allowed state for allowing the displacement of the slope and an inhibited state for inhibiting the displacement of the slope by switching control of the switching means.

9. The mounting device for the object to be mounted according to claim 2, wherein the control means inhibits the displacement of the slope when one of the second mounting detection means detects that the object to be mounted is in the mounted state on the ground side plate and the third mounting detection means detects that the object to be mounted is in the mounted state on the vehicle side plate.

10. The mounting device for the object to be mounted according to claim 2, wherein the displacement of the slope includes displacement of the main plate between the low position and the high position.

11. The mounting device for the object to be mounted according to claim 1, wherein the control means inhibits the displacement of the slope when the first mounting detection means detects that the object to be mounted is in the non-mounted state on the main plate.

* * * * *